Jan. 24, 1961 — R. A. MacMILLAN — 2,969,501
METHOD AND MEANS FOR TESTING MAGNETIC
PROPERTIES OF TOROID CORES
Original Filed Aug. 2, 1956 — 2 Sheets-Sheet 1
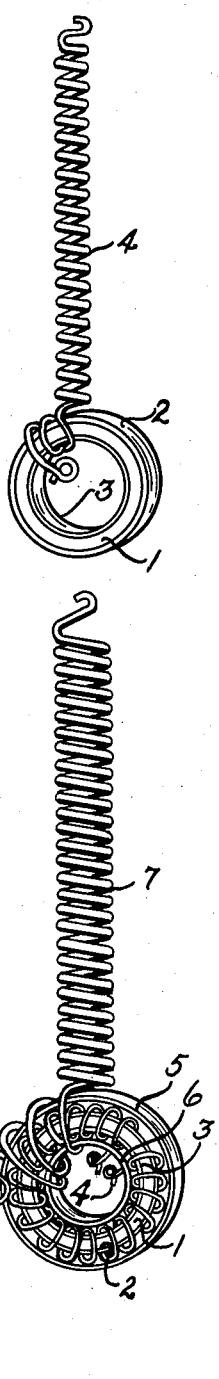
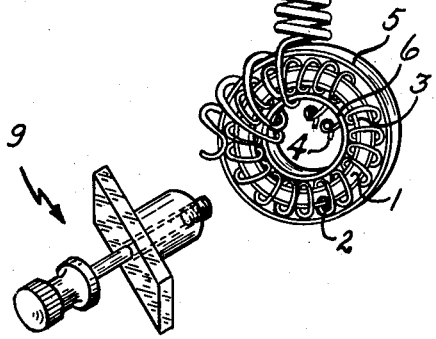
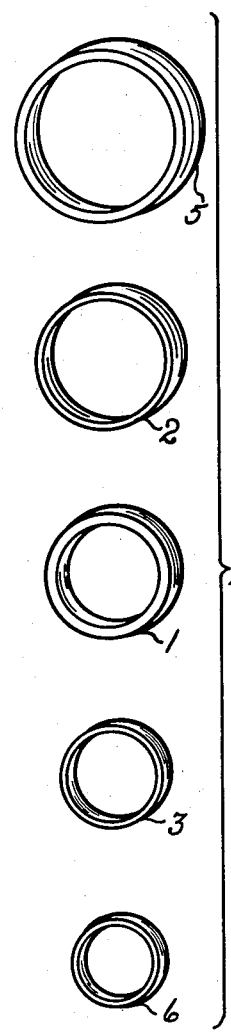
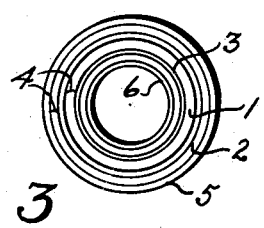
INVENTOR.
RAYMOND A. MacMILLAN

United States Patent Office 2,969,501
Patented Jan. 24, 1961

2,969,501

METHOD AND MEANS FOR TESTING MAGNETIC PROPERTIES OF TOROID CORES

Raymond A. MacMillan, Greenwood, Mass., assignor to the United States of America as represented by the Secretary of the Air Force Original application Aug. 2, 1956, Ser. No. 601,851. Divided and this application Sept. 12, 1957, Ser. No. 683,671

5 Claims. (Cl. 324—34)

(Granted under Title 35, U.S. Code (1952), sec. 266)

The invention described herein may be manufactured and used by or for the United States Government for governmental purposes without payment to me of any royalty thereon.

This invention relates to the testing of magnetic materials, and particularly to methods and means for testing toroidal-shaped samples of such magnetic materials.

In order to take measurements of magnetic materials, such material is often formed in the shape of a ring or toroid. These ring samples are then wound with a layer of insulating tape and two or more windings of wire are put over the tape. When many different material compositions are formed into rings of uniform size, each must have electrical windings applied and removed for evaluation and tests. This process is tedious and time-consuming even if accomplished with the aid of a toroid winding machine. Furthermore, a toroid winding machine does not always accommodate the large difference in wire diameter that would be convenient to use for magnetic measurements.

Objects of the invention are to provide methods and structures to expedite the determination of the magnetic characteristics of test samples of materials to be evaluated.

More specifically, objects of the invention are to provide, in an electrical system testing methods and structures facilitating application of a pair of pre-formed current conductors to each of a series of test samples in succession, in a manner to permit rapid transfer from one to another of the series.

These and other advantages, features and objects of the invention will become more apparent from the following description taken in connection with the illustrative embodiments in the accompanying drawings, wherein:

Fig. 1 shows separately the toroidal sample and concentric insulators;

Fig. 2 shows the first stage of assembly with partial application of the detector winding;

Fig. 3 shows a plan view in cross section of the sample after application of the detector winding and insulators;

Fig. 4 shows the second stage of assembly with partial application of the primary winding;

Fig. 5 is the thumb screw clamping bar used in mounting the coils; and

Figure 6:
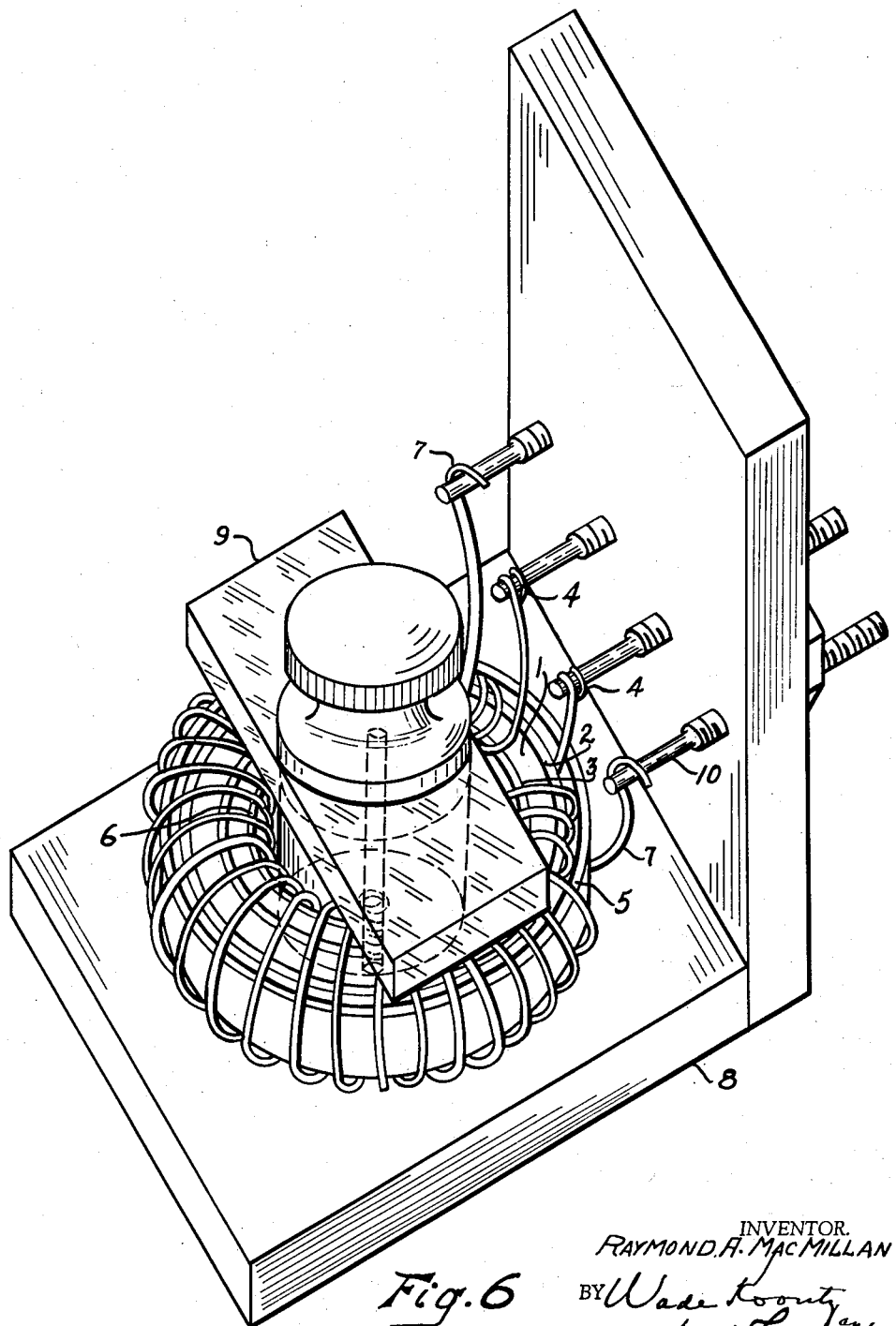
Fig. 6 shows the device completely mounted and in operative form.

As will be clear from the drawings, the magnetic core sample 1 is surrounded by two insulator rings 2 and 3 which fit the inside and outside peripheries of the core sample 1 snugly. The insulator rings 2 and 3 may be made of Teflon about 0.05" thick which was chosen in laboratory tests as the material for the insulating rings to support the winding springs 4 and 7 because of low coefficient of friction together with its mechanical strength and its excellent electrical characteristics. The anti-friction characteristic of this material allows easy threading of close fitting windings of fine wire and many turns. An alternative method would be the use of Teflon-covered spring wire which would have the advantage of permitting the turns to be in contact allowing more turns to be used and eliminating the first two insulating rings 2 and 3.

The windings are made of a substance such as preformed Phosphor bronze springs which are threaded over the Teflon insulators inclosing the core samples. In laboratory tests the secondary or detector winding 4 was a 50 turn winding made of 0.020" spring wire wound on a %2" rod with 54 turns to the inch. The primary winding 7 was made of 0.050" spring wire wound on a ½" rod with a spacing equal to the diameter of the wire. These spring windings 4 and 7 have low electrical resistance, are non-magnetic and withstand large distortions with no permanent change in shape. They can be threaded on and off the core samples many times without loss of shape. The spring diameter can be determined by trial based on the material used. Too small a diameter makes threading difficult and causes permanent distortion in the spring; too large a diameter makes a bulky assembly and decreases the spacing of the winding from the core sample. This excess spacing is not desirable, particularly in the winding which supplies the measuring instrument because of the possibility of error due to stray fields. This consideration is not so important for the outer winding to which power is supplied.

In this type assembly, shorted turns are a possibility. However, such a condition is easily detected by holding the coil assembly in front of a strong light where the position of each turn may be readily observed. Correcting such a fault may be simply accomplished by moving the entire coil or the offending turn slightly on the Teflon support rings and allowing the spring winding to assume its natural shape. After the application of the insulators 2, 3, 5 and 6 and the windings 4 and 7, the assembly is mounted on the Bakelite base 8 and held in place by a thumb screw and plastic clamping bar 9. Connections are then made to tapered pins 10 extending through the base mounting. The ends of the inner coil 4 may be formed into two turn loops of small diameter to hold tightly when pushed over the connected tapered pins 10. The heavy outer coil 7 can be formed in like manner. However, there is generally sufficient spring tension stored in the outer coil winding 7 to make a firm contact by means of hooks shaped on the winding ends. The entire assembly can be accomplished without tools in less than four minutes.

Although the invention has been described with reference to particular embodiments it will be understood to those skilled in the art that the invention is capable of a variety of alternative embodiments within the spirit and scope of the appended claims.

This application is a division of co-pending application No. 601,851, entitled Method and Means for Testing Magnetic Properties of Toroid Cores, filed August 2, 1956, by Raymond A. MacMillan.

I claim:

1. The method of testing a series of toroidal magnetic cores of rigid, one-piece construction which comprises the steps of constraining a pair of electrical conductors into helical form, threading said pair of helical conductors around each of said cores in sequence, causing an electric current to be supplied to one of said conductors, and observing the magnitude of the current generated in the other of said conductors.

2. The method of testing a series of toroidal magnetic cores of rigid, one-piece construction which comprises the steps of constraining a pair of electrical conductors into helical form, placing the first helical winding thus formed about each of said cores in sequence placing the second helical winding about said first winding, causing an electric current to be supplied to one of said windings, and observing the magnitude of the current generated in the other of said windings.

3. A method for use in testing the magnetic properties of an annular body which comprises the steps of forming a flexible electrical conductor into a helix whose turns are internally stressed to maintain the helical form and threading said helical form onto said annular body to produce a current conducting toroid coil.

4. An electrical system comprising, in combination, a series of rigid, one-piece rings of insulating material of graduated sizes, said rings being disposed in concentric relationship and including inner and outer rings as well as a pair of medial rings, a magnetizable core disposed concentrically between said pair of medial rings, a first pre-stressed conductor wound helically about the sub-assembly consisting of said core and medial rings, a second pre-stressed conductor wound helically about the larger assembly consisting of said inner and outer rings and the conductor-enclosed sub-assembly disposed between said inner and outer rings, and means for supplying electric current to one of said conductors, to facilitate use of the other conductor for indicating the degree of magnetization of said core.

5. An electrical system comprising, in combination, a pair of rigid, one-piece rings of insulating material disposed in concentric relationship, a magnetizable core disposed between said rings, a first pre-stressed conductor wound helically about the sub-assembly consisting of said core and rings, a second pre-stressed conductor wound helically about the larger assembly including said first pre-stressed conductor, said rings, and said core, and means including a second pair of rigid, one-piece rings for insulating said conductors, one from the other.

References Cited in the file of this patent

UNITED STATES PATENTS

| | | |
|---|---|---|
| 1,320,980 | Bowman | Nov. 4, 1919 |
| 1,570,948 | Crouch | Jan. 26, 1926 |
| 1,695,679 | Berlowitz | Dec. 18, 1928 |
| 1,897,604 | Clemons | Feb. 14, 1933 |
| 2,711,509 | Endres et al. | June 21, 1955 |
| 2,829,338 | Lord | Apr. 1, 1958 |